United States Patent [19]

Karmel et al.

[11] Patent Number: 4,829,434

[45] Date of Patent: May 9, 1989

[54] ADAPTIVE VEHICLE

[75] Inventors: Amir Karmel; David K. Loo; James H. Rillings, all of Birmingham, Mich.

[73] Assignee: General Motors Corporation, Detroit, Mich.

[21] Appl. No.: 44,019

[22] Filed: Apr. 29, 1987

[51] Int. Cl.$^4$ .................. B60K 41/08; G06F 15/20
[52] U.S. Cl. .................. 364/424.1; 74/866
[58] Field of Search .......... 364/424, 425, 424.1, 364/460; 340/52 F; 74/866

[56] References Cited

U.S. PATENT DOCUMENTS

| | | | |
|---|---|---|---|
| 4,333,668 | 6/1982 | Hendrickson et al. | 280/707 |
| 4,453,516 | 6/1984 | Filsinger | 123/352 |
| 4,470,396 | 9/1984 | Hasumi et al. | 123/488 |
| 4,471,437 | 9/1984 | Yoshino et al. | 364/424.1 |
| 4,523,281 | 6/1985 | Noda et al. | 364/424.1 |
| 4,551,802 | 11/1985 | Smyth | 364/424.1 |
| 4,589,676 | 5/1986 | Meloche et al. | 340/52 R |
| 4,595,072 | 6/1986 | Barnea | 280/707 |
| 4,679,145 | 7/1987 | Beeck et al. | 364/424.1 |
| 4,691,812 | 9/1987 | Takizawa | 364/424.1 |
| 4,731,727 | 3/1988 | Rauch et al. | 364/424.1 |

Primary Examiner—Gary Chin
Attorney, Agent, or Firm—Howard N. Conkey

[57] ABSTRACT

An adaptive vehicle is described that analyzes the dynamic behavior of the vehicle operator based on an operator condition (such as the headway maintained by the operator), a vehicle condition (such as vehicle speed) and environmental conditions (such as precipitation rate and tracking distance maintained by a trailing vehicle) to automatically adapt the vehicle (such as adjusting the transmission shift point schedule) to the driving mood, style or expectations of the vehicle operator.

3 Claims, 3 Drawing Sheets

ADAPTIVE VEHICLE

This invention relates to an adaptive vehicle which automatically adapts its performance characteristics to the expectations and capabilities of the vehicle operator as they change with different operators, operator mood, driving environment and vehicle operating conditions.

In conventional vehicle designs, the operating characteristics of the vehicle are fixed at the time the vehicle is assembled and thereafter, the operating characteristics remain constant for the life of the vehicle except as they may vary due to normal wear of various vehicle components.

Since the operating characteristics of the vehicle are fixed, those characteristics are selected as a compromise which attempts to satisfy a wide range of drivers under a wide range of vehicle and environmental operating conditions. Therefore, while the operating characteristics of the vehicle may be appropriate for a given vehicle operator and for a given set of vehicle and environmental conditions, they may not be appropriate for other vehicle operators or for a different set of vehicle and environmental conditions.

Various systems have been proposed for varying a vehicle performance characteristic in response to sensed parameters in order to adapt the vehicle operation to the existing vehicle operating conditions. For example, the U.S. Pat. No. 4,453,516 describes a system for varying the response of the throttle valve position to the gas pedal position according to vehicle operating conditions such as speed and transmission gear shift position and further suggests the possibility of modifying the relationship as a function of an environmental condition such as roadway temperature. Another U.S. Pat. No. 4,602,695 varies the power steering flow rate in response to a parameter indicative of vehicle operation on a mountain road, an average road or a highway so as to adapt the power steering to those different road conditions. The U.S. Pat. No. 4,597,049 describes a throttle controller in which the throttle controller gain is varied as a function of vehicle speed.

While the foregoing systems provide for a degree of adaptation of the vehicle operating characteristics in response to sensed vehicle and environmental operating conditions, they do not provide a fully integrated adaptive vehicle which takes into consideration vehicle operator dynamic behavior that indicates the personal driving style or preferences of the vehicle operator. The driver preferences may represent the type of vehicle performance desired by the operator for a given situation or for a specific driving task. Such preferences are often reflected by vehicle classifications such as sporty, luxury or economy.

For example, one vehicle operator may desire a sporty vehicle with associated vehicle response while another operator may desire a luxury oriented vehicle and the associated response and ride. When applied to the speed shift point of a transmission, one operator may desire a high shift point for a sporty response while another operator may desire a low speed shift point for a comfort oriented response.

SUMMARY OF THE INVENTION

This invention provides for a fully integrated adaptive control system for a vehicle that modifies the performance characteristics of the vehicle based not only upon the vehicle operating conditions such as speed and fuel remaining and on the environmental conditions such as weather, roads, and traffic, but also based upon the dynamic behavior of the vehicle operator so as to adapt the vehicle performance to the expectations, mood or personal driving style of the vehicle operator.

The invention may be best understood by reference to the following description of a preferred embodiment and the drawings in which.

Figure 1:
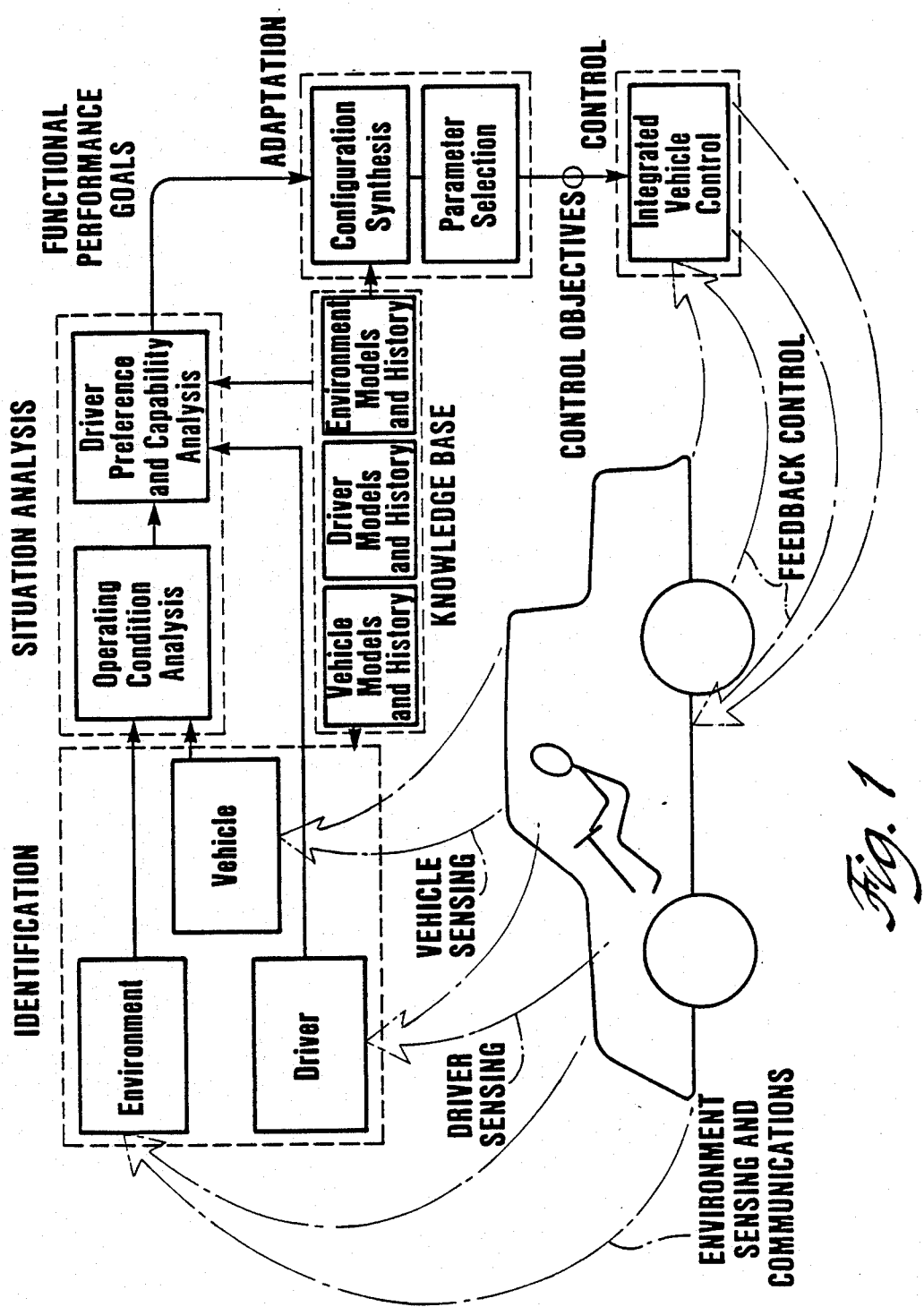
FIG. 1 is a general schematic of an adaptive vehicle incorporating the principles of this invention.

Referring to FIG. 1, the general functions of an adaptive vehicle in carrying out this invention are illustrated. The adaptive vehicle contains six major functional blocks: sensing, identification, situation analysis, a knowledge base, adaptation and control.

The vehicle senses not only commands from the driver, but also the dynamic behavior of the driver as an element in a control loop including, for example, response times, precision of control, and perhaps physiological data. The vehicle also senses directly, and indirectly through a communications channel, the local and global driving environment such as weather, road surface condition, traffic, behavior of other vehicles and similar information. The vehicle also monitors its own performance, its own internal condition and its state of health.

The identification block combines sensor data with models stored in the knowledge base to produce an updated description of the driver, the driving environment, and the vehicle. This information is passed to the situation analysis block where descriptions of the vehicle and the driving environment are combined to produce an analysis of the current operating conditions for the vehicle. This analysis takes into account weather, road condition, traffic, type of driving, such as urban and highway, vehicle condition, amount of fuel and similar factors, drawing on the knowledge base as required. The results of this analysis are combined with information on the identity and performance of the driver, and with data from the knowledge base to determine the capabilities and preferences of that particular driver under the current operating conditions. The result of this analysis is a set of functional performance goals for the vehicle—a quantitative description of the way the vehicle is to behave under the current set of driver, environmental and vehicle conditions.

The adaptation block uses vehicle models and design data from the knowledge base to determine the vehicle and control system configuration that best meets the performance goals. The vehicle subsystem parameters are adjusted to the appropriate values and a set of control objectives are established. The integrated vehicle control block coordinates control of the vehicle's individual dynamical elements to carry out these control objectives.

Figure 2:
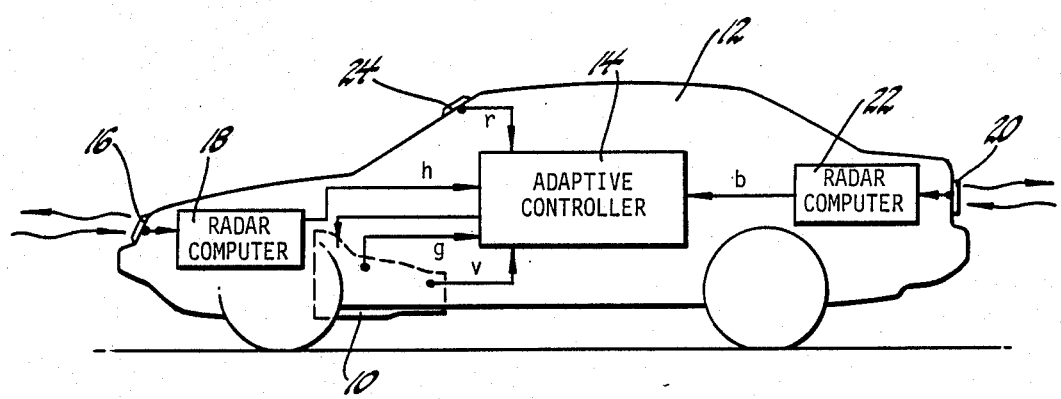
FIG. 2 is a schematic diagram of a vehicle incorporating the principles of this invention in the control of the shift points of a transmission.

Referring to FIG. 2, the invention is described with respect to the adaptive control of the vehicle speed shift points of an automatic transmission 10 of a vehicle 12. In general, the speed shift point schedule is adaptively adjusted to provide a schedule that fits the driving mood, preference or style of the vehicle operator. The speed shift point schedule may be increased to provide a "sporty" feel in the transmission response to vehicle operating conditions in response to an aggressive driving style of the vehicle operator or decreased to provide a non-sporty, luxury feel in the transmission response to vehicle operating conditions in response to a defensive driving style of the vehicle operator.

In order to adaptively adjust the speed shift point schedule of the transmission 10 to fit the vehicle operator driving mood or preference, the invention provides for the automatic monitoring and evaluation of the dynamic behavior of the vehicle operator taking into consideration the vehicle and environmental conditions to establish the driving style or performance expectations of the vehicle operator.

In this embodiment, the dynamic behavior of the vehicle operator from which operator driving style is deduced is based on the spacing or headway to a preceding vehicle maintained by the operator taking into consideration the vehicle and environmental conditions. A short headway is interpreted as an indication of a vehicle operator with an aggressive driving style. An operator having this characteristic typically has a preference for a sporty feel in the transmission response to the vehicle operating conditions. Conversely, a long headway distance is indicative of a vehicle operator with a defensive driving style. An operator having this characteristic typically has a preference for a non-sporty luxury feel in the transmission response.

In evaluating the headway to establish the driving style or preference of the vehicle operator, other conditions must be considered. One such condition is the vehicle condition such as vehicle speed. For example, a headway at one vehicle speed indicative of an operator having a defensive driving style representing an expectation or desire for a non-sporty feel in vehicle operation may at a higher vehicle speed be indicative of an operator having an aggressive driving style representing an expectation or desire for a sporty feel in vehicle operation.

Another condition to be considered in evaluating the dynamic behavior of the vehicle operator is the trailing distance maintained by the operator of a trailing vehicle. This distance has an influence on the headway distance maintained by the vehicle operator and is therefore included in the factors used to evaluate the driving style or preferences of the vehicle operator.

Yet another condition to be considered is the driving environment. While a particular headway to a preceding vehicle may be representative of a particular driving style or preference of a vehicle operator under one environmental condition, that same headway may not be representative of that driving style or preference of the same vehicle operator under another environmental condition. For example, a headway distance representing a defensive driving style of a vehicle operator under a dry environmental condition may, when the vehicle is being operated in a rainy condition, be indicative of an aggressive vehicle operator desiring a sporty vehicle response.

In accord with the foregoing, the transmission 10 is adaptively controlled in response to vehicle conditions, driver conditions and environmental conditions to provide for fully automatic adaptive control of the automatic transmission 10 for a wide range of vehicle operators under a wide range of vehicle and environmental operating conditions.

Again referring to FIG. 2, the adaptive control of the automatic transmission 10 as above described is provided by an adaptive controller 14 that monitors vehicle velocity v by a conventional speed sensor in the transmission 10 monitoring the speed of the output drive to the drive wheels of the vehicle 12. This signal may be in the form of voltage pulses having a frequency directly related to vehicle speed. The adaptive controller 14 further monitors the transmission operating gear g by means of a gear sensor in the automatic transmission 10 or by monitoring the ratio between the input drive speed to the transmission to the output drive speed from the transmission 10.

The headway distance h maintained by the vehicle operator to a preceding vehicle is provided to the adaptive controller 14 by means of a conventional forward looking radar system comprised of a radar transmitter 16 and a radar computer 18. In general, the radar system transmits an electromagnetic signal and senses the electromagnetic signal reflected from a preceding vehicle to compute the headway h being maintained by the vehicle operator.

Similarly, a rearward looking radar system comprised of a transmitter 20 and a radar computer 22 detects the distance b maintained by a trailing vehicle. This distance b is provided to the adaptive controller 14.

A rain sensor 24 (which may be a rain sensor used in conjunction with control of the windshield wiper system of the vehicle 12) provides a signal to the adaptive controller 14 representing the precipitation rate r.

The adaptive controller 14 responds to the various inputs as previously described to adaptively adjust the vehicle speed shift schedule of the transmission 10 to automatically adapt the transmission shift schedule to fit the driving style or performance expectations of the vehicle operator. The adaptive controller 14 then provides shift signals to the transmission 10 in accord with well known transmission control routines.

The preferred embodiment of the adaptive controller 14 is a vehicle mounted digital computer which accepts the various input signals and processes them in accord with a predetermined program to adaptively control the vehicle speed shift points of the automatic transmission 10.

Figure 3:
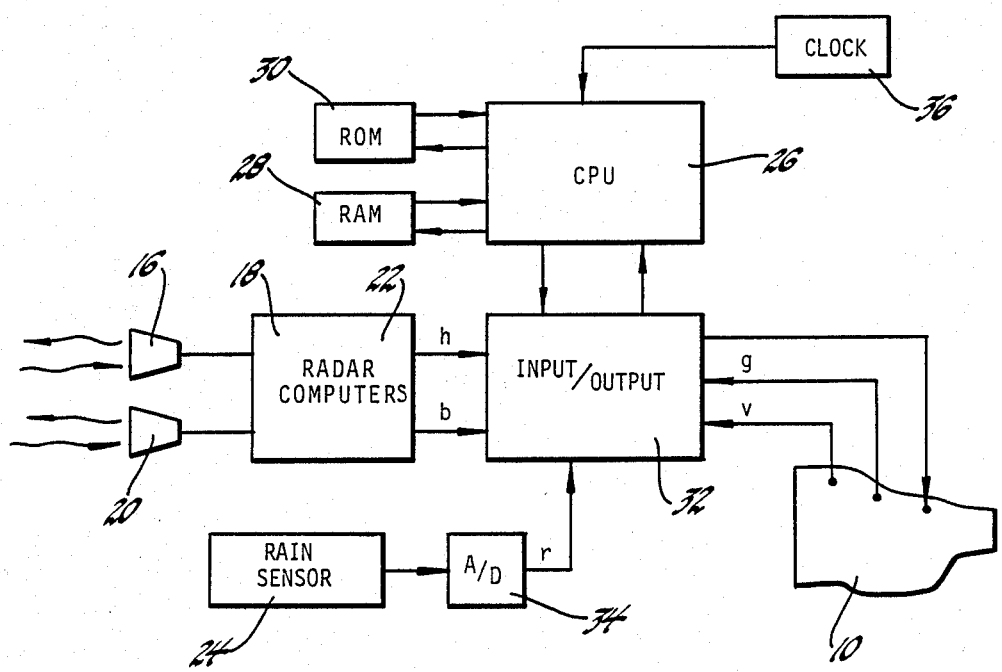
FIG. 3 illustrates a vehicle mounted computer which is a preferred embodiment of the adaptive controller of FIG. 2.

As seen in FIG. 3, the digital computer basically comprises a central processing unit (CPU) 26 which interfaces in the normal manner with random access memory (RAM) 28, a read-only memory (ROM) 30, an input/output unit 32, an analog-to-digital converter (A/D) 34 and a clock 36.

In general, the CPU 26 executes an operating program permanently stored in the ROM 30 which also contains lookup tables, initial values and constants utilized in the control of the shift points of the automatic transmission 10. Data is temporarily stored and retrieved from various ROM designated address locations in the RAM 28.

The RAM 28 also includes a nonvolatile memory section that stores parameters during operation of the adaptive controller 14 to be used during subsequent operations of the vehicle 12. Included within this nonvolatile RAM section is a lookup table of vehicle speed shift points for the various gears of the automatic transmission 10 and tables used in evaluating the dynamic behavior of the vehicle operator. In this embodiment, the latter tables provide a schedule of the average headway h maintained by the vehicle operator for each gear shift as a function of the various vehicle and environmental conditions including vehicle speed v, trailing distance b and precipitation rate r. As will be described, the vehicle speed shift point schedules are adaptively adjusted to fit the driving mood or preference of the vehicle operator as previously described. The nonvolatile memory section of the RAM 28 may be made nonvolatile by continuous application of power thereto through an unswitched power supply (not shown). Alternatively, the RAM 28 may be comprised of memory elements that retain their state even during periods of power shutdown.

Discrete input signals to the adaptive controller 14 are sensed and the values of analog signals are determined via the input/output circuit 32 which receives directly the vehicle speed signal v output of the transmission 10, the signal output of the transmission 10 representing the transmission gear state g, the headway and trailing distances h and b provided by the radar computers 18 and 22 and the precipitation rate r provided by the analog-to-digital converter 34 which has an input from the rain sensor 24.

Figure 4:
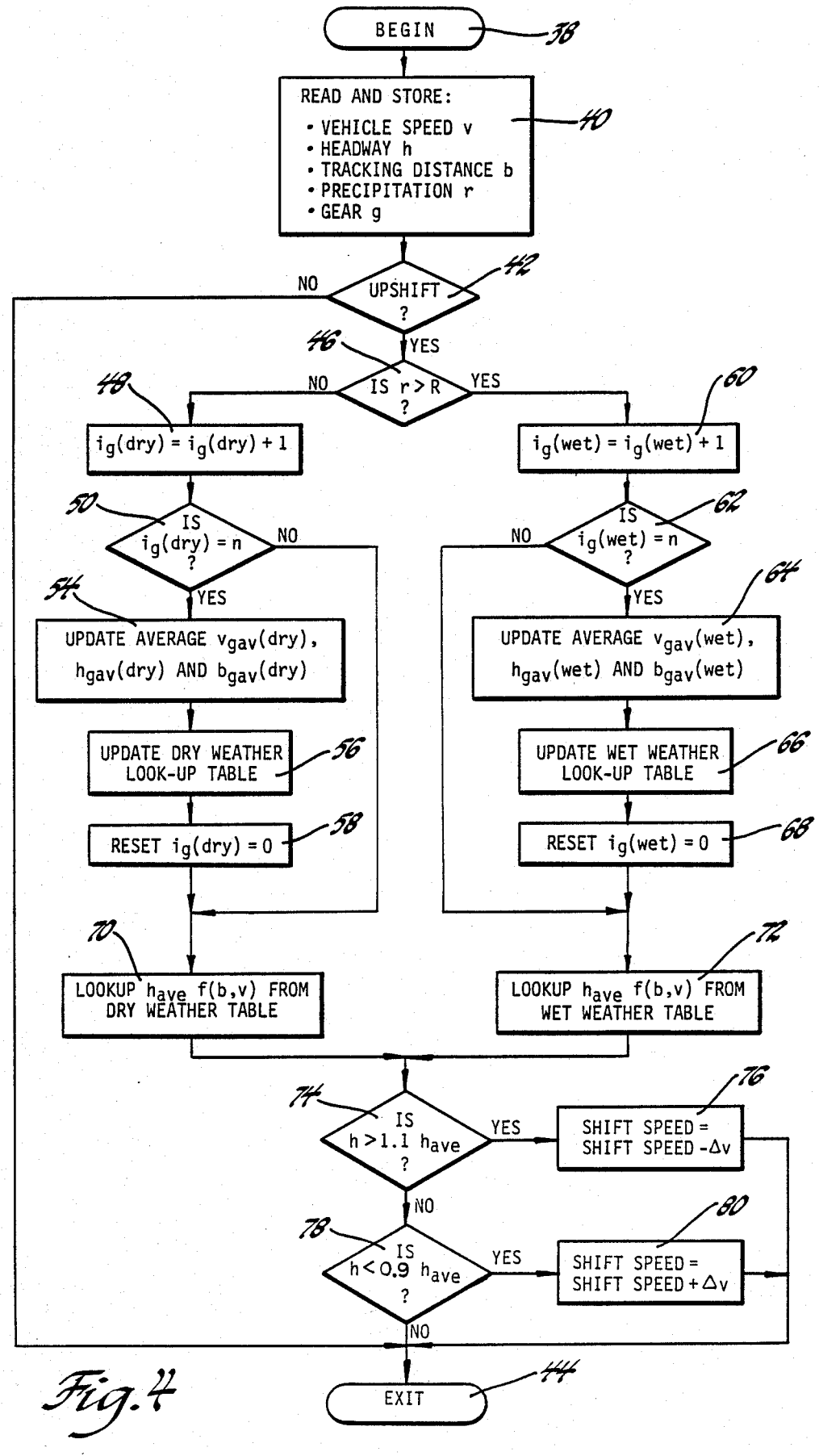
FIG. 4 is a diagram illustrative of the operation of the computer of FIG. 3 for adaptively controlling the shift point of an automotive transmission of the vehicle in accord with the principles of this invention.

The operation of the digital computer of FIG. 3 in adaptively controlling the vehicle speed shift points of the automatic transmission 10 in response to the vehicle, environmental and operator conditions is described in FIG. 4. In general, the digital computer executes a program routine stored in the ROM 30 at repeated timed intervals. For example, the program loop may be executed at 100 millisecond intervals as established by an internal counter and the clock 36.

The program routine begins at step 38 and proceeds to a step 40 where the last sensed gear state g of the transmission is saved and the various inputs to the adaptive controller 14 are read and stored in ROM designated RAM memory locations. These signals include the value of vehicle speed v, headway distance h, the tracking distance b, the precipitation rate r provided by the rain sensor 24 and the present transmission gear g provided by the transmission 10. At step 42, the program determines if an upshift has occurred in the transmission 10 based on a comparison of the prior gear state saved at step 40 and the gear state read and stored. If not, the program exits the routine at step 44. These steps are repeated until such time that an upshift in the transmission gear is sensed at step 42.

When an upshift is detected, the program proceeds to a step 46 where the precipitation rate r stored at step 40 is compared with a calibration constant R representing a predetermined precipitation rate. If the precipitation rate is less than the calibration value representing a dry environment, the program proceeds to a step 48 where a counter $i_g$ (dry) is incremented where g is the transmission gear state sensed at step 40. This counter contains the number of upshifts to the gear read at step 44 during dry environmental conditions. Since g may be any gear except the lowest gear, it is understood that a counter is provided for each of the gears except low that is associated with an upshift.

At the next step 50, the contents of the counter incremented at step 48 is compared with a calibration constant n. In one embodiment, n may assume a value of 100.

If $i_g$ (dry) is equal to n, the program proceeds from the step 50 to a step 54 where running averages of the values of vehicle velocity $v_{gav}$ (dry), headway $h_{gav}$ (dry) and tracking distance $b_{gav}$ (dry) associated with a dry environmental condition and the gear read at step 40 are updated based on the latest values of vehicle speed v, headway h and tracking distance b read and stored at step 40.

From step 54, the program proceeds to a step 56 where a dry weather lookup table is updated based on the averages determined at step 54. The dry weather lookup table updated at step 56 is a three-dimensional table in which a schedule of values of average headway distances $h_{ave}$ at the time of transmission gear shift are stored as a function of the average vehicle speed and the average tracking distance. Based on the values established at step 54, the average headway $h_{ave}$ corresponding to the average values of vehicle speed and tracking distance determined at step 54 is updated to the average value of headway determined at step 54. As will be described, the average headway distances $h_{ave}$ stored in the dry weather lookup table at step 56 will be compared with the instantaneous headway value h stored at step 44 at each transmission upshift event in dry weather conditions to determine the driving style or preference of the vehicle operator so that the transmission speed shifts points may be adaptively adjusted to meet that style or desire.

From step 56, the program proceeds to a step 58 where the counter $i_g$ (dry) is reset to initialize the counter to again count the predetermined number n of upshifts to the corresponding transmission gear in dry weather conditions.

Returning to step 46, if the precipitation rate r is greater than the value R representing a wet weather condition, the program proceeds to a series of steps 60 thru 68 that serve an identical function as the steps 48 thru 58 to update a wet weather lookup table containing a schedule of values of average headway distances $h_{ave}$ at time of transmission gear shift as a function of the average vehicle speed and tracking distances determined during wet weather environmental conditions. As described with respect to the dry weather lookup table associated with step 56, the schedule of average headway values stored in the wet weather lookup table are used in the adaptive control of the transmission vehicle speed shift point.

It will be noted that single lookup tables are provided for all gears for each of the dry and wet weather conditions since the vehicle speed shift point ranges of the transmission 10 do not overlap. Therefore, a single table will accommodate a storage of headway distances at the time of transmission shift as a function of average vehicle speed and tracking distances. However, it will be readily understood that if the transmission gear shift speed ranges of the transmission 10 overlap, a separate lookup table will be provided for each of the transmission gears for both wet and dry weather conditions.

In a dry weather environment, if the shift count has not reached the criteria set forth in step 50 or following step 58, the program proceeds to a step 70 where the average headway distance stored in the dry weather lookup table is retrieved as a function of the instantaneous vehicle speed v and tracking distance b read and stored at step 40. If the vehicle operator is maintaining a headway distance at the time of the upshift less than the average retrieved from the lookup table, it is indicative of an aggressive vehicle operator who prefers a sporty feel in the transmission response to the vehicle operating conditions. Conversely, if the vehicle operator is maintaining a headway distance at the time of the upshift that is greater than the average headway distance retrieved from the dry weather lookup table, it is indicative of a non-aggressive or defensive driving style representing an operator who prefers a non-sporty, more luxury feel in the transmission response to the vehicle operating conditions.

Similarly, in a wet weather environment, if the shift count has not reached the criteria set forth in step 62 or following step 68, the program proceeds to a step 72 where the average headway distance stored in the wet weather lookup table is retrieved as a function of the instantaneous vehicle speed v and tracking distance b read and stored at step 40. As described with respect to step 70, if the vehicle operator is maintaining a headway distance at the time of the transmission upshift less than the average retrieved value retrieved from the wet weather lookup table, it is indicative of an aggressive vehicle operator who prefers a sporty feel in the transmission response to the vehicle operating conditions. Conversely, if the vehicle operator is maintaining a headway distance at the time of the upshift that is greater than the average headway distance retrieved from the wet weather lookup table, it is indicative of a defensive driving style that represents a preference for a non-sporty, luxury feel in the transmission response to the vehicle operating conditions.

From step 70 or step 72, the program determines the driving style or performance expectation of the vehicle operator by comparing the headway h being maintained by the vehicle operator at the time of transmission upshift to the average value retrieved from memory at step 70 or 72. If the headway being maintained is slightly greater (such as by a factor of 1.1) than a value such as the average value retrieved from memory, it is indicative of a defensive driving style representative of a preference for a non-sporty, luxury feel in the transmission response to the vehicle operating conditions. If the next step 74 senses this condition, the program proceeds to a step 76 where the vehicle speed shift point of the transmission stored in a schedule in the nonvolatile section of the RAM for the upshift sensed at step 42 to the gear g sensed at step 40 is decremented. This decrease in the transmission speed shift point is associated with a non-sporty, more luxury feel in the transmission operation. Conversely, if the headway being maintained by the vehicle operator is less than a value slightly greater than the average value retrieved from memory (such as by a factor of 0.9) it is indicative of a vehicle operator having an aggressive driving style representative of a preference for a sporty feel in the transmission response to the vehicle operating conditions. If the step 78 senses this condition, the program proceeds to a step 80 where the transmission vehicle speed shift point stored in the RAM for the upshift sensed at step 42 to the gear g sensed at step 40 is incremented by a predetermined value. This increase in the vehicle speed shift point of the transmission is associated with a sporty feel in the transmission operation. From step 78, if the instantaneous headway being maintained by the vehicle operator is within the deadband established by the steps 74 and 78, step 76, step 80 or step 42, the program exits the routine at step 44.

In the foregoing manner, the dynamic behavior of the vehicle operator is analyzed based on an operator condition (headway maintained by the operator at the transmission shift points), a vehicle condition (speed) and environmental conditions (precipitation rate and tracking distance maintained by a trailing vehicle) to automatically adapt the vehicle (transmission shift point schedule) to the driving mood, style or expectations of the vehicle operator. By this adaptive vehicle control, the vehicle is automatically adapted to various vehicle operators or varying moods of an operator for varying vehicle and environmental conditions.

The foregoing description of a preferred embodiment for the purpose of illustrating a preferred embodiment thereof is not to be considered as limiting or restricting the invention since many modifications may be made by the exercise of skill in the art without departing from the scope thereof.

The embodiments of the invention in which an exclusive property or privilege is claimed are defined as follows:

1. A system for adaptively controlling a vehicle performance characteristic to the expectations and capabilities of an operator of the vehicle as they change with different operator moods, driving environment and vehicle operating conditions, the system comprising, in combination:

memory means for storing a schedule of values of a predetermined operator dependent condition as a function of the values of a predetermined environmental condition and a predetermined vehicle operating condition, the memory means having memory locations each addressed by a predetermined value of the environmental condition and a predetermined value of the vehicle operating condition and having a value of the operator dependent condition stored thereat;

means for recurrently (A) sensing the value of the operator dependent condition, the value of the environmental condition and the value of the vehicle operating condition, (B) retrieving the stored value of the predetermined operator dependent condition at the memory location addressed by the sensed value of the environmental condition and the sensed value of the vehicle operating condition, (C) comparing the retrieved and sensed values of the operator dependent condition to determine a dynamic characteristic of the operator representing the expectations and capabilities of the operator, (D) determining the average of the sensed values of the operator dependent condition and (E) updating the stored value of the predetermined operator dependent condition at the memory location addressed by the sensed value of the environmental condition and the sensed value of the vehicle operating condition with the determined average of the sensed value of the operator dependent condition; and means adjusting the vehicle performance characteristic in accord with the determined dynamic characteristic of the operator, the vehicle performance characteristic being automatically adjusted based on the deviation of the value of the operator dependent condition from a norm represented by the average of the values of the operator dependent condition.

2. A system for adaptively controlling a vehicle performance characteristic to the expectations and capabilities of an operator of the vehicle as they change with different operator moods, driving environment and vehicle operating conditions, the system comprising, in combination:

memory means for storing a schedule of values of a predetermined dependent condition as a function of the values of a predetermined environmental condition and a predetermined vehicle operating condition, the memory means having memory locations each addressed by a predetermined value of the environmental condition and a predetermined value of the vehicle operating condition and having a value of the operator dependent condition stored thereat;

means for recurrently (A) sensing the value of the operator dependent condition, the value of the environmental condition and the value of the vehicle operating condition, (B) retrieving the stored value of the predetermined operator dependent condition at the memory location addressed by the sensed value of the environmental condition and the sensed value of the vehicle operating condition, (C) comparing the retrieved and sensed values of the operator dependent condition to determine a dynamic characteristic of the operator representing the expectations and capabilities of the operator, (D) determining the average of the sensed values of the operator dependent condition, the average of the sensed values of the environmental condition and the average of the values of the vehicle operating conditions and (E) updating the stored value of the predetermined operator dependent condition at the memory location addressed by the determined average value of the environmental condition and the determined average value of the vehicle operating condition with the determined average of the sensed values of the operator dependent condition; and means adjusting the vehicle performance characteristic in accord with the determined dynamic characteristic of the operator, the vehicle performance characteristic being automatically adjusted based on the deviation of the value of the operator dependent condition from a norm represented by the average of the values of the operator dependent condition.

3. A system for adaptively controlling the vehicle speed shift point of an automatic transmission of a vehicle in accord with the dynamic characteristics of a vehicle operator, the system comprising, in combination:

memory means for storing a schedule of values of headway distances to a preceding vehicle as a function of the values of precipitation rate and vehicle speed, the memory means having memory locations each addressed by a predetermined value of precipitation rate and a predetermined value of vehicle speed;

means for sensing the headway distance to a preceding vehicle;

means for determining the average of the values of the headway distance to a preceding vehicle;

means for sensing the precipitation rate;

means for sensing vehicle speed;

means for retrieving the stored value of headway distance at the memory location addressed by the sensed value of precipitation rate and the sensed value of vehicle speed;

means for comparing the retrieved and sensed values of headway distances to determine the dynamic characteristic of the vehicle operator;

means for adjusting the vehicle speed shift point of the transmission (A) downward when the sensed value of the headway distance is greater than the retrieved value and (B) upward when the sensed value of the headway distance is less than the retrieved value; and means for updating the stored value of the headway distance at the memory location addressed by the sensed value of vehicle speed and the sensed value of precipitation rate with the determined average of the values of the headway distance, the vehicle speed shift point of the transmission being adjusted based on the deviation of the sensed value of the headway distance from a norm represented by the average of the values of the headway distance.

* * * * *